United States Patent
Cagno et al.

(10) Patent No.: US 7,761,728 B2
(45) Date of Patent: Jul. 20, 2010

(54) APPARATUS, SYSTEM, AND METHOD FOR RESETTING AN INTER-INTEGRATED CIRCUIT DATA LINE WITH A CLOCK LINE

(75) Inventors: Brian James Cagno, Tucson, AZ (US); Kenny Nian Gan Qiu, Tucson, AZ (US); Donald Scott Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 11/626,220

(22) Filed: Jan. 23, 2007

(65) Prior Publication Data

US 2008/0178033 A1 Jul. 24, 2008

(51) Int. Cl.
*G06F 1/08* (2006.01)
(52) U.S. Cl. .................. 713/501; 713/400; 713/500
(58) Field of Classification Search ............... 710/100, 710/104, 110, 305; 713/400, 500, 501
See application file for complete search history.

(56) References Cited

U.S. PATENT DOCUMENTS

| | | | | |
|---|---|---|---|---|
| 3,731,278 | A * | 5/1973 | Eldridge et al. | 710/71 |
| 4,601,291 | A * | 7/1986 | Boute et al. | 607/27 |
| 6,147,967 | A * | 11/2000 | Ying et al. | 370/222 |
| 7,016,993 | B2 * | 3/2006 | Lee | 710/100 |
| 7,089,338 | B1 * | 8/2006 | Wooten et al. | 710/110 |
| 7,478,286 | B2 * | 1/2009 | Humphrey et al. | 714/43 |
| 2004/0117525 | A1 * | 6/2004 | Lee | 710/104 |
| 2004/0232997 | A1 * | 11/2004 | Hein et al. | 331/16 |
| 2006/0119437 | A1 * | 6/2006 | Thomsen et al. | 331/10 |
| 2006/0192586 | A1 * | 8/2006 | Vorbach | 326/6 |
| 2006/0242348 | A1 * | 10/2006 | Humphrey et al. | 710/305 |
| 2007/0112990 | A1 * | 5/2007 | Hayashita | 710/305 |
| 2007/0240019 | A1 * | 10/2007 | Brady et al. | 714/43 |
| 2009/0157932 | A1 * | 6/2009 | Hayashita | 710/110 |

* cited by examiner

*Primary Examiner*—Thomas Lee
*Assistant Examiner*—Zahid Choudhury
(74) *Attorney, Agent, or Firm*—Kunzler Needham Massey & Thorpe

(57) ABSTRACT

An apparatus, system, and method are disclosed for resetting an inter-integrated circuit data line with a clock line. A hang module detects that a data line that carries data between an I2C bus master and an I2C bus slave is hung, wherein the I2C bus master and I2C bus slave communicate over the data line and a clock line that carries a clock signal. The clock module increases a clock line frequency to a specified frequency in response to the detected data line hang. The pulse generation module transmits specified clock pulses from the I2C bus master to the I2C bus slave over the clock line at the specified increased frequency in response to the detected data line hang. A frequency detector module detects clock pulses at the specified increased frequency. A timer module detects the specified clock pulses at the specified increased frequency. A reset module resets the I2C bus slave in response detecting the specified clock pulses.

4 Claims, 3 Drawing Sheets

APPARATUS, SYSTEM, AND METHOD FOR RESETTING AN INTER-INTEGRATED CIRCUIT DATA LINE WITH A CLOCK LINE

CROSS-REFERENCES TO RELATED APPLICATIONS

The subject matter of this application is related to two United States patent applications, the first entitled "APPARATUS, SYSTEM, AND METHOD FOR RESETTING AN INTER-INTEGRATED CIRCUIT DATA LINE USING A NEGATIVE VOLTAGE" filed Jan. 23, 2007 as Ser. No. 11/626,227 and the second entitled "APPARATUS, SYSTEM, AND METHOD FOR AUTOMATICALLY RESETTING AN INTER-INTEGRATED CIRCUIT BUS" filed Jan. 23, 2007 as Ser. No. 11/626,230.

BACKGROUND OF THE INVENTION

1. Field of the Invention

This invention relates to resetting a bus and more particularly relates to resetting an Inter-Integrated Circuit (I2C) bus.

2. Description of the Related Art

The I2C serial protocol is often used to create a high-level communication path between devices in electronic systems. An I2C bus requires only a clock line and a data line, and operates using a simple communication protocol. The clock line and data line are each bidirectional. Each device connected to an I2C bus has a unique address. A device initiating a transfer is referred to as a bus master while devices responding to the transfer are referred to as bus slaves. Any I2C device may function as the bus master or as a bus slave. The simplicity and flexibility of the I2C bus makes it a cost effective communications solution in many applications.

The I2C bus master typically issues a START command over the I2C bus to other devices, followed by an address of a destination bus slave device. In addition, the bus master also specifies whether data will be read or written. The destination I2C bus slave transmits an ACKNOWLEDGE signal, and the bus master transmits or receives data. When the transfer is complete, the bus master transmits a STOP and the transaction concludes.

Unfortunately, the simplicity of the I2C bus can be a disadvantage if one or more elements of the bus stops functioning, a condition referred to hereafter as a hang. There are only very limited recovery mechanisms built into I2C devices. When an I2C device hangs, the device typically must be reset to free the bus.

Additionally, I2C devices are often on different card boundaries within an electronic system. As a result, specific resets are not available for the hung I2C. If a specific reset is not available, a power cycle is required to free the bus. Yet a power cycle is often time consuming and can affect devices and systems far beyond the hung I2C device.

From the foregoing discussion, there is a need for an apparatus, system, and method that reset an I2C device. Beneficially, such an apparatus, system, and method would allow I2C devices to be reset without providing specific reset circuits and without cycling power for an extended system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
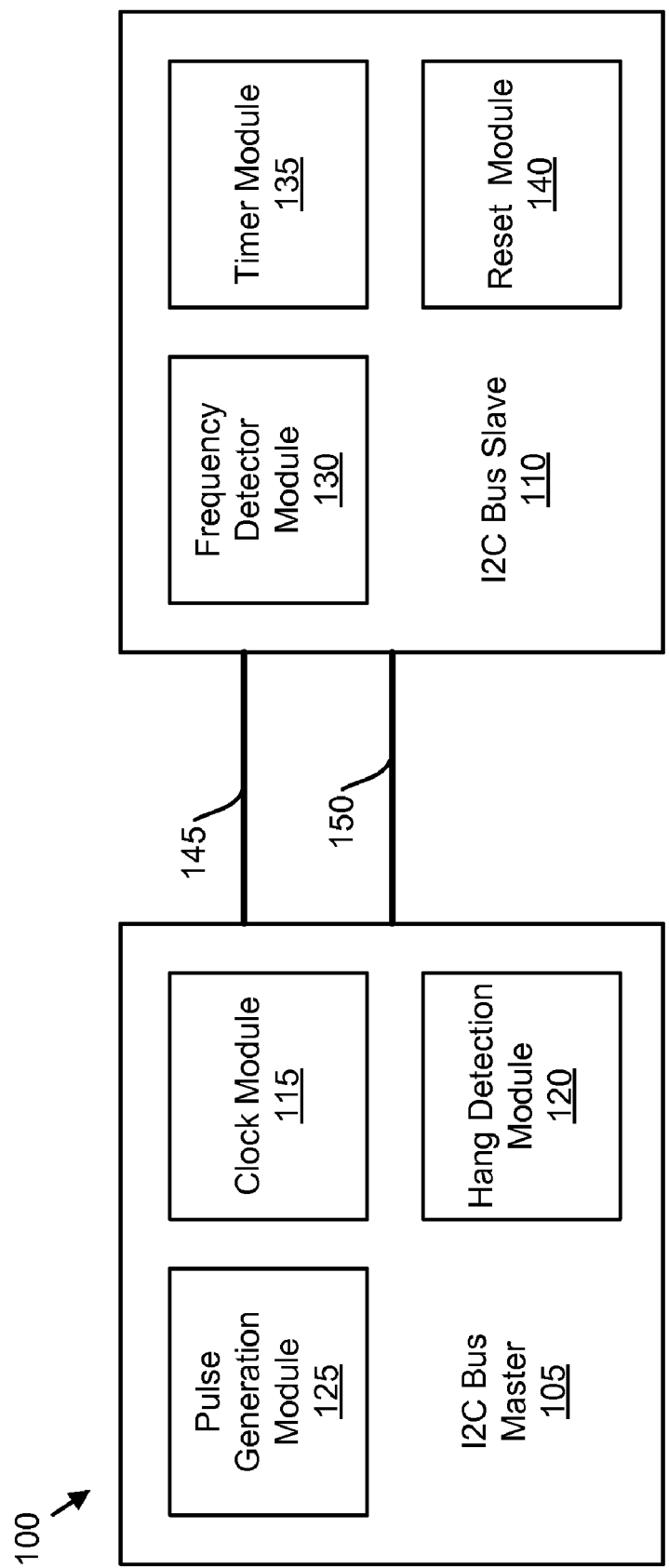
FIG. 1 is a schematic block diagram illustrating one embodiment of an I2C bus slave resetting system in accordance with the present invention.

FIG. 1 depicts a schematic block diagram illustrating one embodiment of an I2C bus slave resetting system 100 in accordance with the present invention. The system 100 includes an I2C bus master 105 and an I2C bus slave 110 in communication over a data line 150 and a clock line 145. Communication between the I2C bus master 105 and the I2C bus slave 110 may be bi-directional. The I2C bus master 105 includes a pulse generation module 125, a clock module 115, and a hang detection module 120. The I2C bus slave 110 includes a frequency detector module 130, a timer module 135, and a reset module 140. The I2C bus master and I2C bus slave may embodied by circuit cards, integrated circuits, portions of integrated circuits, or the like.

In the I2C bus slave resetting system 100, devices initiating communication over a data are referred to as a bus master 105 while devices responding to communication over the data are referred to as bus slaves 110. In an embodiment, any of the I2C devices may function as the bus master or as a bus slave. Although for simplicity in the drawings, only one I2C bus master 105 and one I2C bus slave 110 is shown, any number of I2C bus masters 105 and I2C bus slaves 110 may be used in the system 100.

An I2C bus master 105 communicates data over the data line 150 and the clock line 145 to the I2C bus slave 110. The communication or transfer of data from the I2C bus master 105 to the I2C bus slave 110 is at least at a minimum transfer rate such as one hundred kilohertz (100 kHz) to a maximum of four hundred kilohertz (400 kHz). The hang detection module 120 detects that the data line 150 is hung if the data transfer rate is below the minimum value. For example, the hang detection module may detect that the data line 150 is hung if a binary value of the data line 150 does not change over nine (9) clock cycles. The hang detection module 120 may comprise a hardware element, a software element, parameters, and an internal organization for detection of a hung data line 150.

In response to a detection of a hung data line 150, the clock module 115 generates a clock signal with an increased frequency that is transmitted over the clock line 145. In one embodiment, the specified increased frequency is in the range of one point five to three (1.5-3) times the clock signal frequency. The clock module 115 may comprise hardware elements like a timer function, a software element, parameters, and an internal organization for increasing clock frequency.

The pulse generation module 125 transmits specified clock pulses at the specified increased frequency to the I2C bus slave 110 over the clock line 145 in response to the detected data line hang. For example, the pulse generation module 125 may transmit specified clock pulses with a specified increased frequency of two point five (2.5) times of the clock signal frequency. In addition, the specified clock pulses may comprise three sets of eight pulses each, each pulse set separated by a time interval. The pulse generation module 125 may transmit the specified clock pulses one or more times to clear the hung data line 150 and reset the I2C bus slave 110. The process may be repeated until the I2C bus slave 110 is reset.

The I2C bus slave 110 communicates with the I2C bus master 105 over the data line 150 and the clock line 145. On receiving the specified clock pulses from the pulse generation module 125, the frequency detector module 130 detects the clock pulses at the specified increased frequency. For example, the frequency detector module 130 may detect the clock pulses with a specified increased frequency that is two point five (2.5) times that of the clock signal frequency. The detection of specified increased frequency may be automatic.

For example, the frequency detector module 130 may detect the increase in frequency by using a band pass filter configured to pass clock pulses with the specified increased frequency. Thus, only clock pulses of the specified increased frequency are communicated to the timer module 135.

Alternatively, the frequency detector module 130 may detect the increase in frequency by performing electronic calculations through in-built software, which may start on receiving the specified clock pulses. The frequency detector module 130 may comprise one or more hardware elements like a frequency detector, a software element, parameters, and an internal organization for detecting clock pulses at the specified increased frequency.

The timer module 135 detects the specified clock pulses. In an embodiment, the timer module 135 detects the specified clock pulses at the specified increased frequency. For example, where the specified clock pulses are configured as three (3) sets of eight (8) pulses each, the timer module 135 may count the clock pulses at the specified increased frequency using a counter for a specified time interval. The timer module 135 may then store the count, reset the counter, and count clock pulses for a second time interval.

In addition, the timer module 135 may store the second count and clock and store the count for a third time interval. The timer module 135 may detect the specified clock pulses by storing three (3) counts of eight (8) pulses. The timer module 135 may comprise one or more hardware elements like a timer function, a counter, count registers, and logic gates, software elements, parameters, and an internal organization for detecting the specified clock pulses.

The reset module 140 resets the I2C bus slave in response to the timer module 135 detecting the specified clock pulses. For example, on detecting the third modulated pulse signal, each reset module 140 resets the I2C bus slave 110. The reset module 140 may comprise a hardware element, a software configuration, parameters, and other internal organization.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
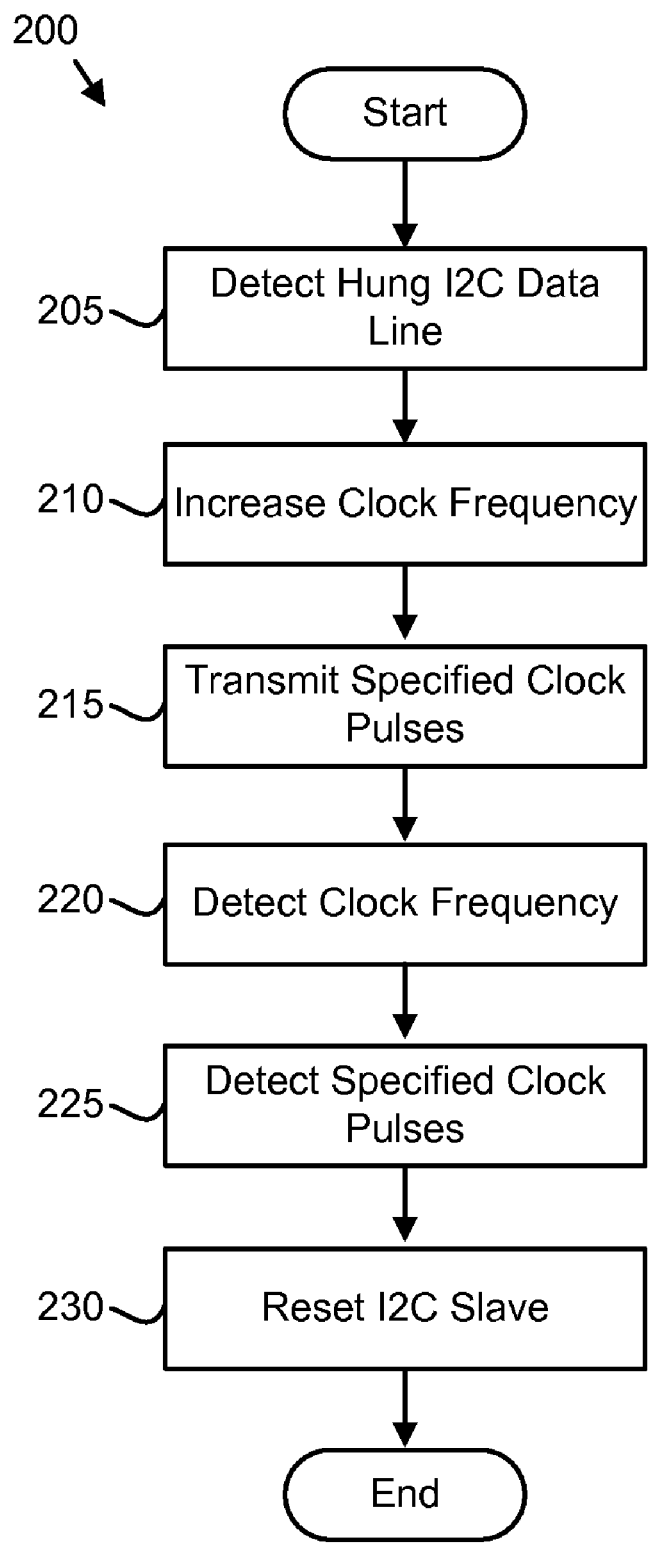
FIG. 2 is a schematic flow chart diagram illustrating one embodiment for resetting an I2C bus slave method in accordance with present invention.

FIG. 2 is a schematic flow chart diagram illustrating one embodiment of a method 200 for resetting an inter-integrated circuit data line with a clock line in accordance with the present invention. The method 200 substantially includes the steps to carry out the functions presented above with respect to the operation of the described system 100 of FIG. 1. The description of the method 200 refers to elements of the FIG. 1, like numbers referring to like elements.

The method 200 begins, in one embodiment, and the hang detection module 120 detects 205 that a data line 150 that carries data between an I2C bus master 105 and the I2C bus slave 110 is hung, wherein the I2C bus master 105 and I2C bus slave 110 communicate over the data line 150 and a clock line 145 that carries a clock signal. For example, the hang detection module 120 may detect that communication or transfer of data from the I2C bus master 105 to the I2C bus slave 110 is less than a minimum specified transfer rate.

If the hang detection module 120 detects 205 that the data line 150 has been held low for longer than the maximum allowable limit, the clock module 115 automatically generates 210 an increased frequency clock signal. For example, the clock module 115 may generate 210 a specified increased frequency in the range of one point five to three times the clock signal frequency.

On generation of the increased frequency clock signal, the pulse generation module 125 automatically transmits 215 specified clock pulses with the specified increased frequency to the I2C bus slave 110 over the clock line 145 in response to the detected data line 150 hang. For example, the pulse generation module 125 may transmit 215 the specified clock pulses with a specified increased frequency of two point five times the clock signal frequency. The specified clock pulses may comprise three sets of eight pulses each, each pulse set separated by a time interval. The time interval may be in the range of fifty to one hundred and fifty percent (50-150%) a duration of a pulse set. Alternatively, the specified clock pulses may comprise two sets of six pulses each. The pulse generation module 125 may transmit 215 the specified clock pulses one or more times to clear the hung data line 150 and reset the I2C bus slave 110.

In response to the transmitted clock signals, the frequency detector module 130 automatically detects 220 the clock pulses at the specified increased frequency. For example, the frequency detector module 130 may detect 220 the clock pulses with a specified increased frequency at two point five (2.5) times of the clock signal frequency by electronic calculations through in-built hardware and/or software.

The timer module 135 automatically detects 225 the specified clock pulses at the specified increased frequency. For example, the timer module 135 may detect 225 three (3) sets of eight (8) pulses each at the specified increased frequency, each pulse set separated by an interval in the range of fifty to one hundred and fifty percent (50-150%) the duration of a pulse set.

In response to detecting the specified clock pulses, the reset module 140 resets 230 the I2C bus slave 110. For example, on detecting of the third set of eight (8) pulses, the reset module 140 may reset the I2C bus slave 110.

Figure 3:
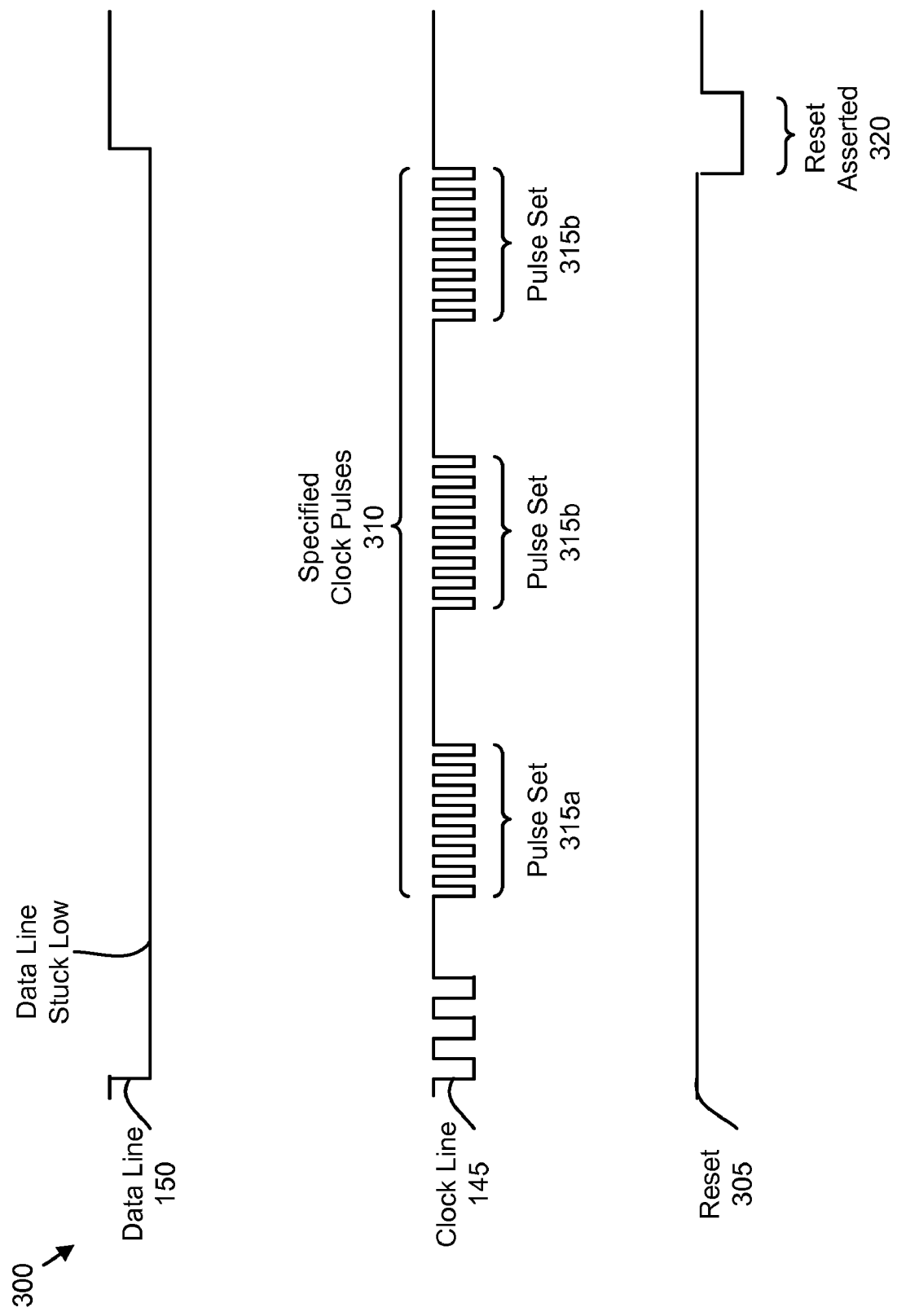
FIG. 3 is a schematic diagram illustrating one embodiment of reset timing in accordance with the present invention.

FIG. 3 is a schematic diagram illustrating one embodiment of reset timing 300 in accordance with the present invention. The timing 300 substantially illustrates the functions presented above with respect to the operation of the described system 100 of FIG. 1 and the method 200. The description of the timing 300 refers to elements of the FIGS. 1 and 2, like numbers referring to like elements. The timing 300 shows a data line 150 stuck low. That is, communication or transfer of data from the I2C bus master 105 to the I2C bus slave 110 is less than a minimum transfer rate. FIG. 3 further shows a clock line 145. The clock line 145 is shown transmitting specified clock pulses 310 comprising three pulse sets 315 in response to the detected hang. Each pulse set 315 comprises eight pulses each, each pulse set 315 separated by an interval of time. Finally, FIG. 3 shows, a reset asserted 320 for a reset 305 of the I2C bus slave 110. One of skill in the art will recognize that the present invention may be practiced in a number of embodiments. The example of FIG. 3 is illustrative of one embodiment, and should not be construed as limit the scope of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A system to reset an Inter-Integrated Circuit (I2C) bus slave, the system comprising:
   an I2C bus master comprising hardware circuits and communicating over a data line and a clock line and comprising
      a clock module generating a clock signal at a clock signal frequency that is transmitted over the clock line;
      a hang detection module detecting that the data line is hung;
      a pulse generation module transmitting specified clock pulses with a specified increased frequency in the range of 1.5 to 3 times the clock signal frequency to the I2C bus slave over the clock line in response to the detected data line hang;
   the I2C bus slave comprising hardware circuits and communicating with the I2C bus master over the data line and the clock line and comprising
      a frequency detector module detecting clock pulses at the specified increased frequency;
      a timer module detecting the specified clock pulses at the specified increased frequency; and
      a reset module resetting the I2C bus slave in response to the timer module detecting the specified clock pulses.

2. The system of claim 1, wherein the specified clock pulses comprise three sets of serial eight pulses each, each pulse set separated by an interval.

3. A method for resetting an I2C bus slave, the method comprising:
   detecting, by use of a processor, that a data line that carries data between an I2C bus master and the I2C bus slave is hung, wherein the I2C bus master and I2C bus slave communicate over the data line and a clock line that carries a clock signal at a clock signal frequency;
   increasing a clock line frequency to a specified increased frequency in the range of 1.5 to 3 times the clock signal frequency in response to the detected data line hang;
   transmitting specified clock pulses from the I2C bus master to the I2C bus slave over the clock line at the specified increased frequency in response to the detected data line hang;
   detecting clock pulses at the specified frequency;
   detecting the specified clock pulses at the specified frequency; and
   resetting the I2C bus slave in response detecting the specified clock pulses.

4. The method of claim 3, wherein the specified clock pulses comprise three sets of eight serial pulses each, each pulse set separated by an interval in the range of fifty to one hundred and fifty percent of a duration of a pulse set.

* * * * *